US011943133B2

(12) United States Patent
Yin et al.

(10) Patent No.: US 11,943,133 B2
(45) Date of Patent: Mar. 26, 2024

(54) HIERARCHICAL ROUTING METHOD ORIENTED TO CROSS-BOUNDARY SERVICE NETWORK

(71) Applicant: ZHEJIANG UNIVERSITY, Zhejiang (CN)

(72) Inventors: Jianwei Yin, Hangzhou (CN); Bangpeng Zheng, Hangzhou (CN); Shengye Pang, Hangzhou (CN); Maolin Zhang, Hangzhou (CN); Yucheng Guo, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/280,261

(22) PCT Filed: Jan. 14, 2022

(86) PCT No.: PCT/CN2022/071916
§ 371 (c)(1),
(2) Date: Sep. 4, 2023

(87) PCT Pub. No.: WO2022/183850
PCT Pub. Date: Sep. 9, 2022

(65) Prior Publication Data
US 2024/0048473 A1 Feb. 8, 2024

(30) Foreign Application Priority Data

Mar. 4, 2021 (CN) .......................... 202110240009.X (51) Int. Cl.
*H04L 45/02* (2022.01)
*H04L 45/00* (2022.01)
(52) U.S. Cl.
CPC .............. *H04L 45/04* (2013.01); *H04L 45/14* (2013.01)

(58) Field of Classification Search
CPC ..... H04L 67/02; H04L 67/59; H04L 43/0864; H04L 45/02; H04L 45/04; H04L 45/14; H04L 45/22; H04L 45/28; H04L 45/30
See application file for complete search history.

(56) References Cited

U.S. PATENT DOCUMENTS

2007/0136236 A1 6/2007 Kussmaul et al.
2017/0161815 A1 6/2017 Akolkar et al.
(Continued)

FOREIGN PATENT DOCUMENTS

CN 1763742 4/2006
CN 102123172 7/2011
(Continued)

*Primary Examiner* — Peter Chen
(74) *Attorney, Agent, or Firm* — Jiwen Chen; Joywin IP Law PLLC (57) ABSTRACT

The present invention discloses a hierarchical routing method oriented to a cross-boundary service network. The hierarchical routing method includes the following steps: (1): proposing reference services for services with same or similar functions in a service network, with differences in format and usage mode, and establishing a unified and standardized usage view for a user; and (2): establishing a method for mapping between the reference services and ordinary services to map the multiple ordinary services with similar functions into the unified reference services, and automatically selecting an optimal ordinary service when called by the user. The hierarchical routing method provided by the present invention can implement high-speed routing of service call in the service network, thereby providing a basis for aggregation and interoperation of cross-boundary services.

8 Claims, 4 Drawing Sheets

(56) References Cited

U.S. PATENT DOCUMENTS

2022/0021601 A1* 1/2022 Zheng ................... H04L 45/123
2022/0247667 A1* 8/2022 Meng ..................... H04L 45/04

FOREIGN PATENT DOCUMENTS

| CN | 109286530 | 1/2019 |
| CN | 112183066 | 1/2021 |

* cited by examiner

HIERARCHICAL ROUTING METHOD ORIENTED TO CROSS-BOUNDARY SERVICE NETWORK

This is a U.S. national stage application of PCT Application No. PCT/CN2022/071916 under 35 U.S.C. 371, filed Jan. 14, 2022 in Chinese, claiming priority of Chinese Application No. 202110240009.X, filed Mar. 4, 2021, all of which are hereby incorporated by reference.

TECHNICAL FIELD

The present invention is applied in the field of service computing, and particularly relates to a hierarchical routing method oriented to a cross-boundary service network.

BACKGROUND TECHNOLOGY

A service-oriented architecture (SOA) is a component model that links different function units (called as services) of an application by well-defined interfaces and contracts between the services. The SOA is proposed to divide tightly coupled systems into business-oriented, coarse-grained, loosely coupled, and stateless services. Services are published for other services to call, and a group of interdependent services constitute a system under the SOA.

With the development and application of the new generation of information technologies such as "cloud computing, big data, Internet of things, mobile Internet, and artificial intelligence", the human cognition and ability will be expanded and improved, and the conventional boundaries will be redefined. "Cross-boundary" means breaking through original boundaries to implement the integration and cooperation of resources inside and outside the boundaries. Cross-boundary services will be deeply integrated and innovated in mode across different industries, organizations, value chains and other boundaries to provide users with multi-dimensional, high-quality and valuable services, which is not only the necessity of technological development, but also an important innovation way for the development of modern service industry.

The integration of cross-boundary services requires an efficient and reliable operation support environment to provide operation support for a service network. For example, the Chinese Patent No. CN109286530A discloses an architecture for operation and support of a cross-boundary service network, and the Chinese Patent No. CN112183066A discloses a method for integrating cross-boundary service targets. At present, there are mainly enterprise service bus, enterprise application integration and other related technologies in this field. Peking University, IBM, Georgia Institute of Technology and others have good research accumulation in cloud integrated resource service, service bus and other aspects, but most of the technologies are aimed at an enterprise-level operating environment, only implementing structure and information integration of services. For the governance and aggregation of cross-boundary services distributed throughout the network, there is still a lack of related engineering methods and operation support carriers.

With the characteristics of high-dimensional isomerism, complex dynamics, and open distribution during the operation of the cross-boundary services, the present invention proposes a hierarchical routing algorithm oriented to a cross-boundary service network, thereby providing a solid theoretical basis for efficient integration of the cross-boundary services.

SUMMARY OF THE INVENTION

An object of the present invention is to provide a hierarchical routing method oriented towards a cross-boundary service network, which can implement high-speed routing of service call in the service network, thereby providing a basis for aggregation and interoperation of cross-boundary services.

The present invention provides the following technical solution:

A hierarchical routing method oriented to a cross-boundary service network, the hierarchical routing method comprising the following steps:

(1): proposing reference services for services with same or similar functions in a service network, with differences in format and usage mode, and establishing a unified and standardized usage view for a user; and (2): establishing a method for mapping between the reference services and ordinary services to map the multiple ordinary services with similar functions into the unified reference services, and automatically selecting an optimal ordinary service when called by the user.

The step (1) comprises:

(1-1): initialization of the reference services: performing function clustering on existing services in the service network by means of data mining, and generating an initial reference service blueprint containing all call parameters for each type of service set; and (1-2): revision by a domain expert: on the basis of the initialization, modifying, merging, and deleting, by the domain expert, the existing call parameters according to existing related service discussions, performing revision to form the final reference services, and publishing the final reference services into the service network.

The step (2) comprises:

(2-1): mapping of the reference services: associating, by a user provider, ordinary services of the user provider with the reference services published in the service network, establishing the method for mapping between the reference services and the ordinary services to map the multiple ordinary services with the similar functions into the unified reference services, and generating a configuration file; and (2-2): call of the reference services: when the user calls the reference services, searching for, by a platform, an associated candidate reference service list and a configuration file thereof, automatically calling the reference services according to a routing strategy, and returning an optimal result.

The step (2-1) comprises:

(2-1-1): recommendation by a system: mapping, by a service provider, services of the service provider to the reference services published in the network, and automatically recommending, by the system, a reference service according to a function;

(2-1-2): semi-automatic mapping: for each parameter $p_i$ of a selected service, calculating semantic similarities between the parameter and all parameters $q_j$ of the reference service, and then taking a maximum value to determine a relationship between the parameters:

$$\max Tsim(p_i,q_j), j=1,2,\ldots n$$

wherein the selected service is an ordinary service of the user provider, each parameter of the selected service comprises an input parameter and an output parameter, the maximum value is cyclically calculated for m times in total, Tsim is a semantic similarity between two parameters calculated according to parameter names, parameter descriptions, and the like, m is the number of parameters for the selected service, and n is the number of parameters for the reference service;

(2-1-3): manual modification by the user: after the semi-automatic mapping, automatically generating, by the system, an initial mapping relationship diagram, and manually adjusting, by the user, an association between the parameters and the relationship therebetween; and (2-1-4): audit by the system: after the user confirms the modification, automatically generating, by the system, a mapping configuration file and uploading the mapping configuration file to a service router, and after audit is passed by an administrator, allowing the service to enter the candidate reference service list.

The step (2-2) comprises: when the user calls the reference services, first forwarding, by a service switch, a request of the user to the service router that the reference services belong to, and calling, by the service router, the corresponding services according to the routing strategy, wherein the routing strategy is a performance strategy that focuses on an overall performance load of a reference service network or a fastest strategy that focuses on a return speed of the services called by the user.

The performance strategy comprises: after the service router receives the request of the user for the reference services, searching for all candidate reference services associated with the reference services; and for each of the candidate reference services, querying a historical call record of the candidate reference service, calculating and evaluating the performance of the candidate reference service, and then selecting the optimal ordinary service:

$$\text{service quality} = \frac{F(\text{count\_call})}{F(\text{avg\_time}) * F(\text{access\_time})}$$

wherein count_call represents the number of times of calling the reference services within a period of time, avg_time represents an average response time, and access_time represents a time of latest call.

The fastest strategy comprises: after the service router receives the request of the user for the reference services, searching for all candidate reference services associated with the reference services and the mapping configuration file of the reference services, converting a parameter format according to the configuration file, simultaneously initiating call requests for all the candidate reference services, and returning a fastest result according to service response times.

A storage model for the service network comprises:

a service entity, capable of independently providing a smallest unit of the services in the service network, where compared with combined services, the service entity is an atomic service that provides a single type of service; and service call information, referring to a group of specific return values obtained by giving a specific input to a definite service, where for the same service, service call information corresponding to different inputs is different.

In the service network, the storage model needs to be built for describing various resources stored in the network, the resources including the service entity and the service call information.

The service entity is expressed in the form of a sextuple, i.e., $$S=\{ID, Address, Info, Dinfo, Entity, Keys\}$$

wherein

"ID" refers to a unique identifier of a service in the cross-boundary service network;

"Address" refers to an access address of a service resource in the network, the access address being represented with a domain name in the cross-boundary service network;

"Info" refers to key information for describing the service, including a service name and service resource value;

"Dinfo" refers to detailed information for describing the service, including all information of the service, such as parameters, pictures, and a software development kit (SDK);

"Entity" refers to description of the service entity, which is information of describing the service with a Web service description language; and "Keys" refer to a keyword set in the service, which facilitates the retrieval and use of the service.

The service call information is expressed in the form of a sextuple, i.e., $$C=\{From, To, Param, Out, Start, End\}$$

wherein

"From" refers to an initiator identifier of service call;

"To" refers to a called service identifier;

"Param" refers to a parameter passed in during the service call;

"Out" refers to a service call result;

"Start" refers to a start time of the service call; and

"End" refers to an end time of the service call.

The present invention has the following beneficial and technical effects: a reference service mechanism is proposed for the services with the same or similar functions in the service network, and mapping of the reference services is established, which facilitates the user to use the services; and during call, the optimal service return result is selected according to the routing strategy, thereby implementing high-speed operation of the service network and even promoting deep integration of the cross-boundary services.

DETAILED DESCRIPTION OF THE EMBODIMENTS

To more specifically describe the present invention, the present invention is described in detail below with the reference to the accompanying drawings.

Figure 1:
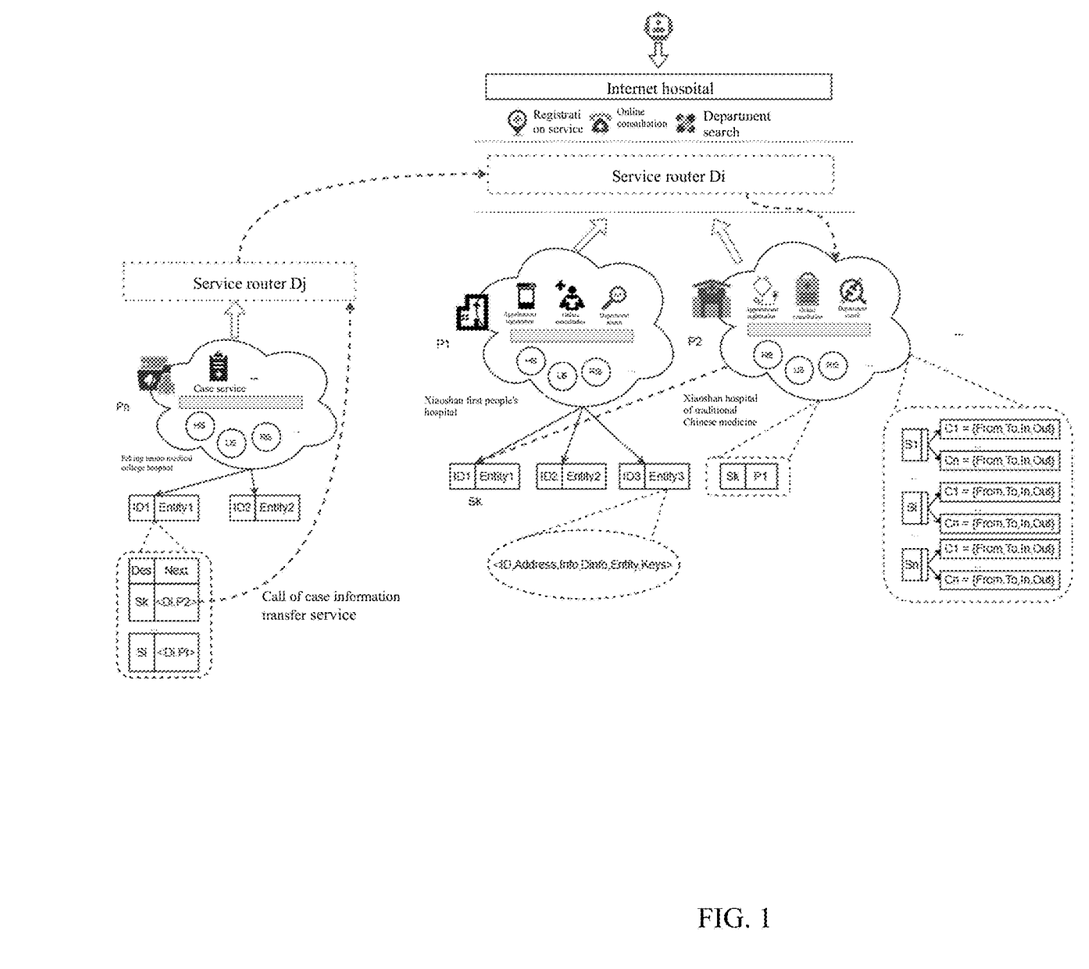
FIG. 1 is a schematic diagram of a storage model for a service network.

FIG. 1 shows a schematic diagram of a storage model for a service network, wherein the storage model is mainly used for describing various resources stored in the service network, the resources including a service entity and service call information.

The service entity is expressed in the form of a sextuple, i.e., $$S=\{ID, Address, Info, Dinto, Entity, Keys\}$$

wherein

"ID" refers to a unique identifier of a service in the cross-boundary service network;

"Address" refers to an access address of a service resource in the network, the access address being represented with a domain name in the cross-boundary service network;

"Info" refers to key information for describing the service, including a service name and service resource value;

"Dinfo" refers to detailed information for describing the service, including all information of the service, such as parameters, pictures, and a software development kit (SDK);

"Entity" refers to description of the service entity, which is information of describing the service with a Web service description language; and "Keys" refer to a keyword set in the service, which facilitates the retrieval and use of the service.

The service call information is expressed in the form of a sextuple, i.e., $$C=\{From, To, Param, Out, Start, End\}$$

wherein

"From" refers to an initiator identifier of service call;

"To" refers to a called service identifier;

"Param" refers to a parameter passed in during the service call;

"Out" refers to a service call result;

"Start" refers to a start time of the service call; and

"End" refers to an end time of the service call.

Figure 2:
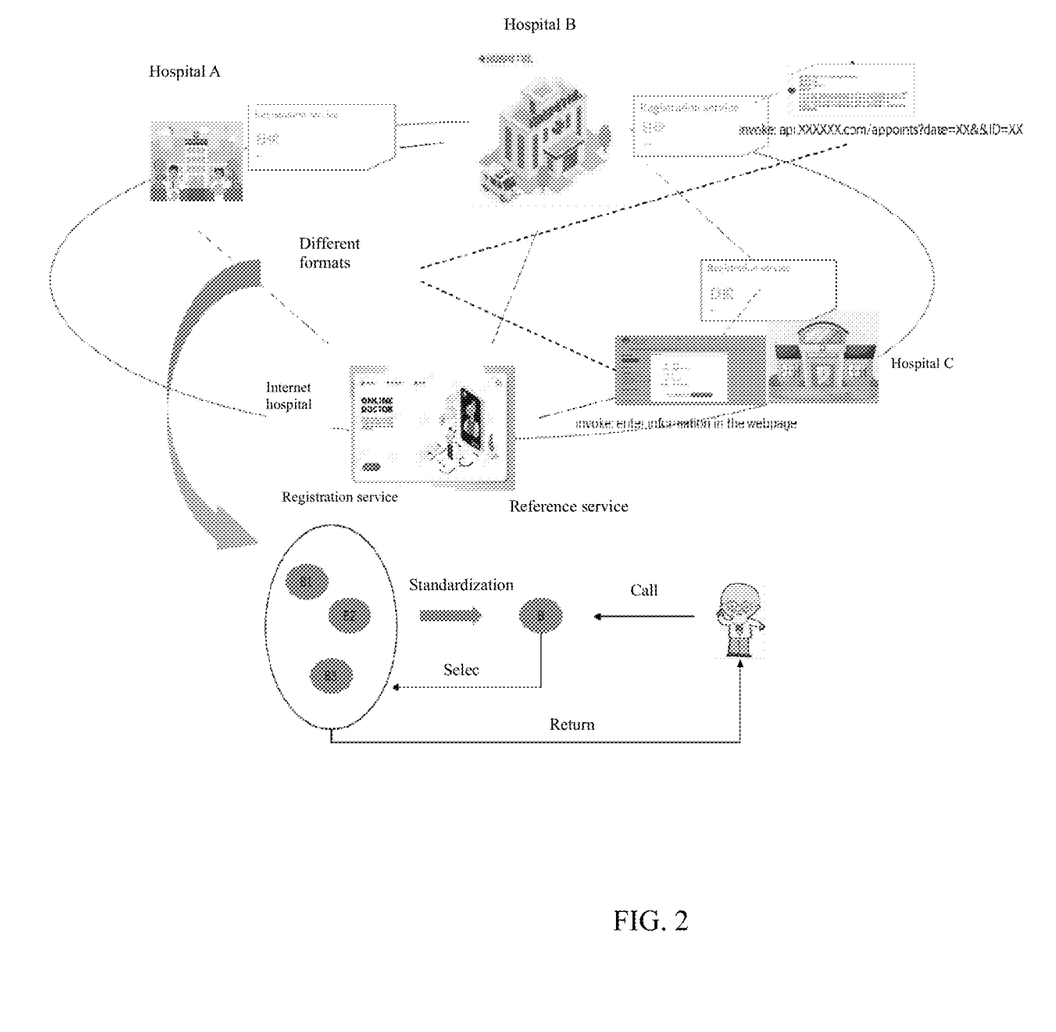
FIG. 2 is a schematic diagram of service registration.

FIG. 2 shows a schematic diagram of a reference service. Proposing a reference service mechanism for services with same or similar functions in a service network, with differences in format and usage mode, and establishing a unified and standardized usage view for a user, comprises the following steps:

(1): initialization of reference services: performing function clustering on existing services in the service network by means of data mining, and generating an initial reference service blueprint containing all call parameters for each type of service set;

(2): revision by a domain expert: on the basis of the initialization, modifying, merging, and deleting, by the domain expert, the existing call parameters according to existing related service discussions, performing revision to form the final reference services, and publishing the final reference services into the service network;

(3): mapping of the reference services: associating, by a user provider, a service of the user provider with a reference service published in the network according to the following rules; and (4): call of the reference services: when the user calls the reference services, selecting and returning, by a platform, an optimal result according to a routing strategy.

Figure 3:
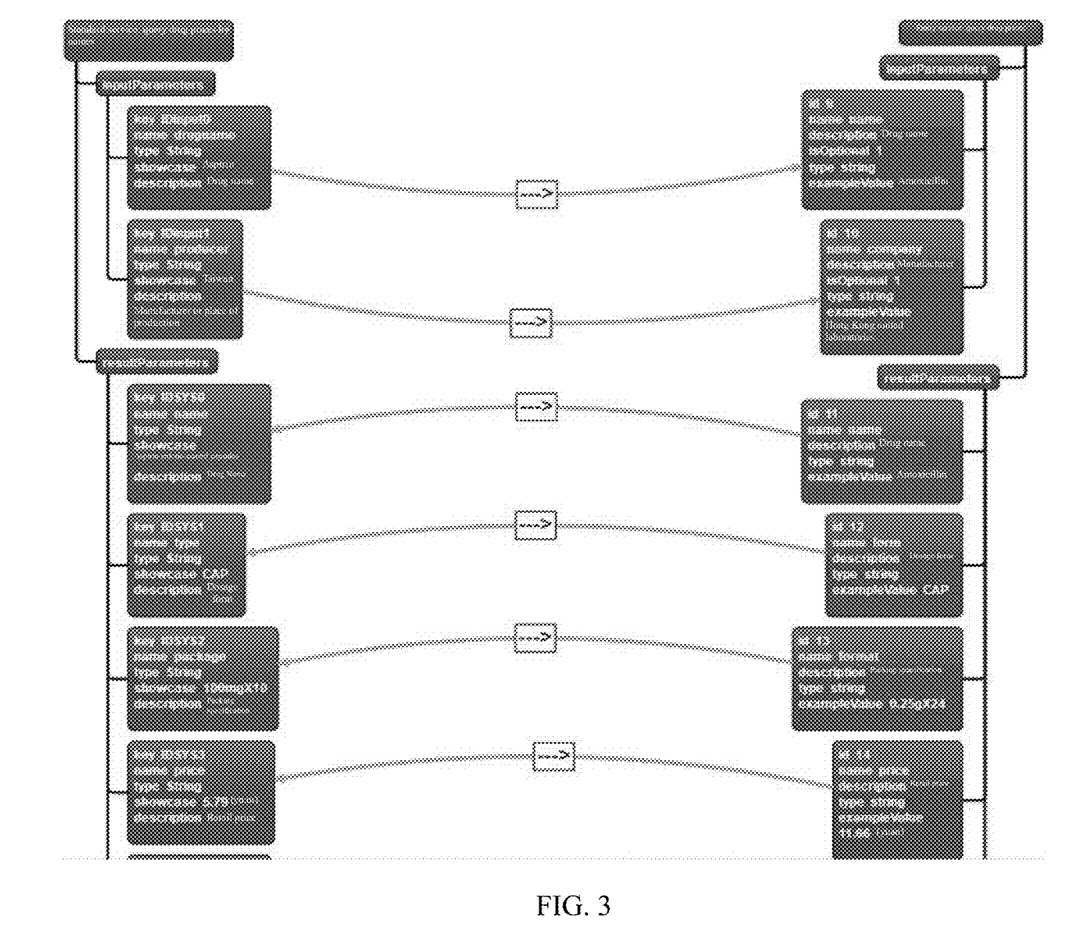
FIG. 3 is an instruction set for a service network.

FIG. 3 shows a schematic diagram of mapping of reference services. Establishing a method for mapping between the reference services and ordinary services to map the multiple ordinary services with similar functions into the unified reference services, and generating a configuration file, comprises the following steps:

(1): recommendation by a system: mapping, by a service provider, services of the service provider to the reference services published in the network, and automatically recommending, by the system, a reference service according to a function;

(2): semi-automatic mapping: for each parameter (an input parameter and an output parameter) $p_i$ of a selected service, calculating semantic similarities between the parameter and all parameters ($q_j$) of the reference service, and then taking a maximum value to determine a relationship between the parameters:

$$\max Tsim(p_i, q_j), j=1, 2, \ldots n$$

wherein the maximum value is cyclically calculated for "m" times in total, "Tsim" is a semantic similarity between two parameters calculated according to parameter names, parameter descriptions, and the like, m is the number of parameters for the selected service, and n is the number of parameters for the reference service;

(3): manual modification by the user: after the semi-automatic mapping, automatically generating, by the system, an initial mapping relationship diagram, and manually adjusting, by the user, an association between the parameters and the relationship therebetween; and (4): audit by the system: after the user confirms the modification, automatically generating, by the system, a mapping configuration file and uploading the mapping configuration file to a service router, and after audit is passed by an administrator, allowing the service to enter the candidate reference service list.

Figure 4:
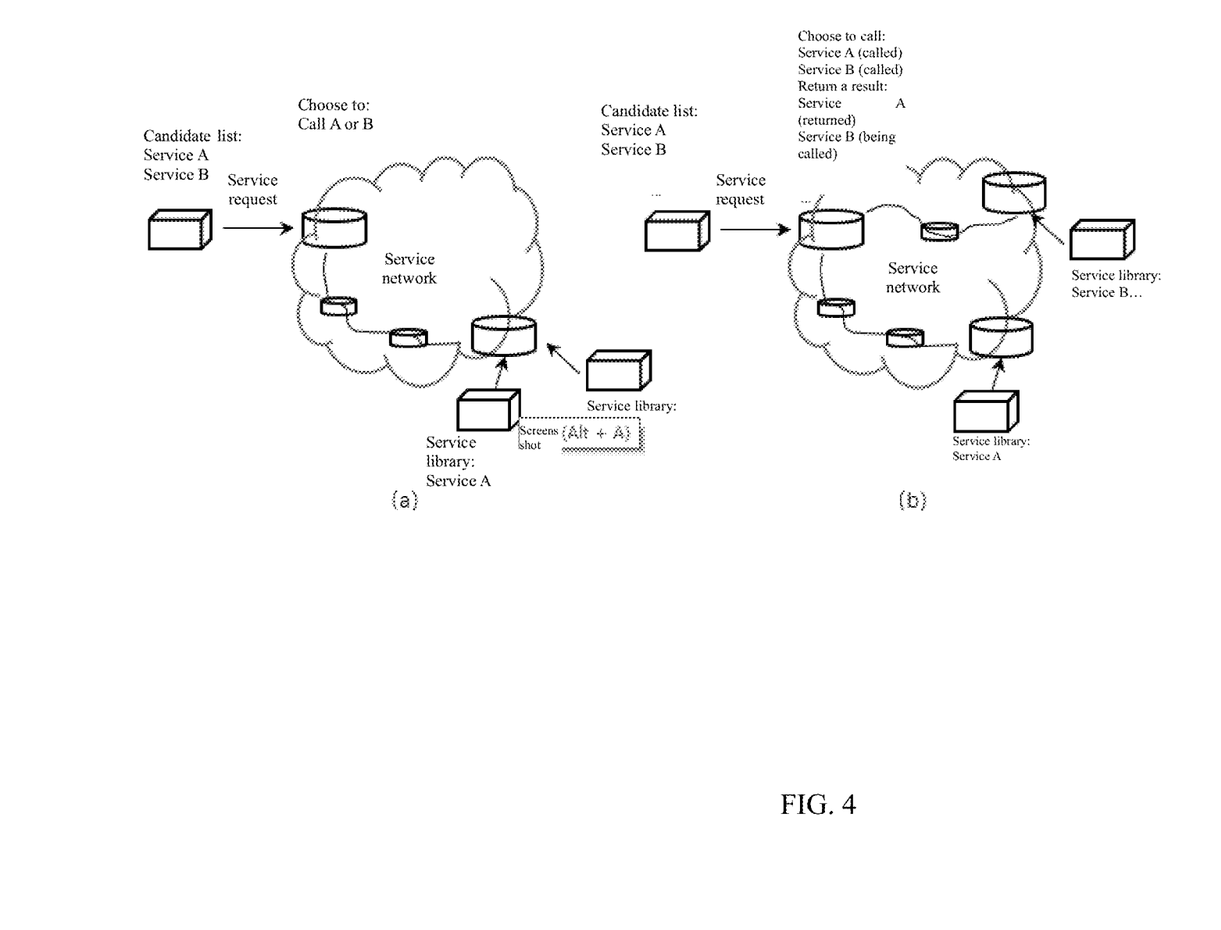
FIG. 4 is a schematic diagram of service call.

FIG. 4 shows a schematic diagram of reference service call. When the user calls the reference services, a service switch first forwards a request of the user to the service router that the reference services belong to, and the service router calls the corresponding services according to the routing strategy. The routing strategy comprises:

(1) an optimal performance strategy, wherein the strategy focuses on an overall performance load of a reference network; after the service router receives the request of the user for the reference services, all candidate services associated with the reference services are searched for; and for each of the candidate services, a historical call record of the candidate service is queried, the performance of the candidate reference service is calculated and evaluated, and then the optimal ordinary service is selected:

$$\text{service quality} = \frac{F(\text{count\_call})}{F(\text{avg\_time}) * F(\text{access\_time})}$$

wherein count_call represents the number of times of calling the reference services within a period of time, avg_time represents an average response time, and access_time represents a time of latest call; and (2) a fastest strategy, wherein the strategy focuses on a return speed of the services called by the user, without considering the overall performance load of the network; and after the service router receives the request of the user for the reference services, all candidate services associated with the reference services and the mapping configuration file of the reference services are searched for, a parameter format is converted according to the configuration file, call requests for all the candidate services are simultaneously initiated, and a fastest result is returned according to service response times. As shown in FIG. 4(b), the service router initiates call requests for both a service a and a service b, and the service a responds faster than the service b, so the service router preferentially returns a call result of the service a.

What is claimed is:

1. A hierarchical routing method oriented to a cross-boundary service network, the hierarchical routing method comprising the following steps:

(1): proposing reference services for services with same or similar functions in a service network, with differences in format and usage mode, and establishing a unified and standardized usage view for a user; and (2): establishing a method for mapping between the reference services and ordinary services to map the multiple ordinary services with similar functions into the unified reference services, and automatically selecting an optimal ordinary service when called by the user;

wherein the step (1) comprises:

(1-1): initialization of the reference services: performing function clustering on existing services in the service network by means of data mining, and generating an initial reference service blueprint containing all call parameters for each type of service set; and (1-2): revision by a domain expert: on the basis of the initialization, modifying, merging, and deleting, by the domain expert, the existing call parameters according to existing related service discussions, performing revision to form the final reference services, and publishing the final reference services into the service network;

wherein the step (2) comprises:

(2-1): mapping of the reference services: associating, by a user provider, ordinary services of the user provider with the reference services published in the service network, establishing the method for mapping between the reference services and the ordinary services to map the multiple ordinary services with the similar functions into the unified reference services, and generating a configuration file; and (2-2): call of the reference services: when the user calls the reference services, searching for, by a platform, an associated candidate reference service list and a configuration file thereof, automatically calling the reference services according to a routing strategy, and returning an optimal result.

2. The hierarchical routing method oriented to a cross-boundary service network according to claim 1, wherein the step (2-1) comprises:

(2-1-1): recommendation by a system: mapping, by a service provider, services of the service provider to the reference services published in the network, and automatically recommending, by the system, a reference service according to a function;

(2-1-2): semi-automatic mapping: for each parameter $p_i$ of a selected service, calculating semantic similarities between the parameter and all parameters $q_j$ of the reference service, and then taking a maximum value to determine a relationship between the parameters:

$$\max T\text{sim}(p_i, q_j), j=1, 2, \ldots n$$

wherein the selected service is an ordinary service of the user provider, each parameter of the selected service comprises an input parameter and an output parameter, the maximum value is cyclically calculated for m times in total, Tsim is a semantic similarity between two parameters calculated according to parameter names, parameter descriptions, and the like, m is the number of parameters for the selected service, and n is the number of parameters for the reference service;

(2-1-3): manual modification by the user: after the semi-automatic mapping, automatically generating, by the system, an initial mapping relationship diagram, and manually adjusting, by the user, an association between the parameters and the relationship therebetween; and (2-1-4): audit by the system: after the user confirms the modification, automatically generating, by the system, a mapping configuration file and uploading the mapping configuration file to a service router, and after audit is passed by an administrator, allowing the service to enter the candidate reference service list.

3. The hierarchical routing method oriented to a cross-boundary service network according to claim 2, wherein the step (2-2) comprises: when the user calls the reference services, first forwarding, by a service switch, a request of the user to the service router that the reference services belong to, and calling, by the service router, the corresponding services according to the routing strategy, wherein the routing strategy is a performance strategy that focuses on an overall performance load of a reference service network or a fastest strategy that focuses on a return speed of the services called by the user.

4. The hierarchical routing method oriented to a cross-boundary service network according to claim 3, wherein the performance strategy comprises: after the service router receives the request of the user for the reference services, searching for all candidate reference services associated with the reference services; and for each of the candidate reference services, querying a historical call record of the candidate reference service, calculating and evaluating the performance of the candidate reference service, and then selecting the optimal ordinary service:

$$\text{service quality} = \frac{F(\text{count\_call})}{F(\text{avg\_time}) * F(\text{access\_time})}$$

wherein count_call represents the number of times of calling the reference services within a period of time, avg_time represents an average response time, and access_time represents a time of latest call.

5. The hierarchical routing method oriented to a cross-boundary service network according to claim 4, wherein the fastest strategy comprises: after the service router receives the request of the user for the reference services, searching for all candidate reference services associated with the reference services and the mapping configuration file of the reference services, converting a parameter format according to the configuration file, simultaneously initiating call requests for all the candidate reference services, and returning a fastest result according to service response times.

6. The hierarchical routing method oriented to a cross-boundary service network according to claim 1, wherein a storage model for the service network comprises:

a service entity, capable of independently providing a smallest unit of the services in the service network, wherein compared with combined services, the service entity is an atomic service that provides a single type of service; and service call information, referring to a group of specific return values obtained by giving a specific input to a definite service, wherein for the same service, service call information corresponding to different inputs is different.

7. The hierarchical routing method oriented to a cross-boundary service network according to claim 6, wherein the service entity is expressed in the form of a sextuple, $$S=\{ID, Address, Info, Dinfo, Entity, Keys\}$$

wherein

"ID" refers to a unique identifier of a service in the cross-boundary service network;

"Address" refers to an access address of a service resource in the network, the access address being represented with a domain name in the cross-boundary service network;

"Info" refers to key information for describing the service, comprising a service name and service resource value;

"Dinfo" refers to detailed information for describing the service, comprising all information of the service, such as parameters, pictures, and a software development kit (SDK);

"Entity" refers to description of the service entity, which is information of describing the service with a Web service description language; and "Keys" refer to a keyword set in the service, which facilitates the retrieval and use of the service.

8. The hierarchical routing method oriented to a cross-boundary service network according to claim 6, wherein the service call information is expressed in the form of a sextuple, $$C=\{From, To, Param, Out, Start, End\}$$

wherein

"From" refers to an initiator identifier of service call;
"To" refers to a called service identifier;
"Param" refers to a parameter passed in during the service call;
"Out" refers to a service call result;
"Start" refers to a start time of the service call; and
"End" refers to an end time of the service call.

* * * * *